United States Patent
Barnetson et al.

(10) Patent No.: US 10,349,473 B2
(45) Date of Patent: Jul. 9, 2019

(54) LED RETROFIT LAMP WITH A STRIKE BARRIER

(71) Applicant: SIGNIFY HOLDING B.V., Eindhoven (NL)

(72) Inventors: Donald Barnetson, San Jose, CA (US); Joel Snook, Grass Valley, CA (US); Josef Kirmeier, Los Gatos, CA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/818,523

(22) Filed: Nov. 20, 2017

(65) Prior Publication Data

US 2018/0332675 A1    Nov. 15, 2018

Related U.S. Application Data

(63) Continuation of application No. 15/267,105, filed on Sep. 15, 2016, now Pat. No. 9,826,582, which is a (Continued)

(51) Int. Cl.
*H05B 33/08* (2006.01)
*F21K 99/00* (2016.01)
(Continued)

(52) U.S. Cl.
CPC ..... *H05B 33/0809* (2013.01); *H05B 33/0803* (2013.01); *H05B 33/0815* (2013.01); *H05B 33/0824* (2013.01); *F21K 9/27* (2016.08); *F21Y 2101/00* (2013.01); *F21Y 2115/10* (2016.08); *Y02B 20/348* (2013.01); *Y02B 20/383* (2013.01); *Y02B 20/386* (2013.01)

(58) Field of Classification Search
CPC ...... H05B 1/34; H05B 33/0803; H05B 39/09; H05B 41/28; H05B 33/0809; H05B 41/3924; H05B 33/0824; H05B 33/0815; Y02B 20/386; Y02B 20/383; Y02B 20/348; F21Y 2115/10; F21Y 2101/00; F21Y 9/27; F21K 9/27
See application file for complete search history.

(56) References Cited

U.S. PATENT DOCUMENTS

| | | | | | |
|---|---|---|---|---|---|
| 3,517,261 | A | * | 6/1970 | Karp | A63J 17/00 315/200 A |
| 3,571,691 | A | * | 3/1971 | Iwata | G05F 1/20 323/268 |

(Continued)

FOREIGN PATENT DOCUMENTS

| CN | 2802894 Y | 8/2006 |
|---|---|---|
| CN | 202524601 U | 11/2012 |
| CN | 203036999 U | 7/2013 |

OTHER PUBLICATIONS

"Cree® XLamp® LED Electrical Overstress." presented at Cree, Inc.4600 Silicon Drive, Durham, NC 27703USA—May 14, 2015.

*Primary Examiner* — Vibol Tan

(57) ABSTRACT

A strike barrier for use in an LED retrofit lamp is provided. The present invention provides the strike barrier with two silicon controlled rectifiers (SCRs) whose input is connected to a bridge rectifier and output is connected to a string of LED through a Zener diode. The strike barrier is compatible with UL ANSI requirement for a normal mode and an abnormal mode.

17 Claims, 5 Drawing Sheets

Related U.S. Application Data continuation-in-part of application No. 14/304,964, filed on Jun. 15, 2014, now Pat. No. 9,686,828.

(51) Int. Cl.
*F21K 9/27* (2016.01)
*F21Y 101/00* (2016.01)
*F21Y 115/10* (2016.01)

(56) References Cited

U.S. PATENT DOCUMENTS

| | | |
|---|---|---|
| 3,573,606 A | 4/1971 | Hart |
| 3,588,592 A * | 6/1971 | Brandstadter ........ H05B 41/046 315/100 |
| 3,614,527 A | 10/1971 | John |
| 3,968,407 A | 7/1976 | Wilson |
| 4,165,475 A | 8/1979 | Pegg |
| 4,433,668 A | 2/1984 | Arthur |
| 4,878,010 A | 10/1989 | Weber |
| 5,572,415 A | 11/1996 | Mohan |
| 5,831,349 A | 11/1998 | Weng |
| 6,356,038 B2 | 3/2002 | Bishel |
| 7,872,428 B1 | 1/2011 | Papanicolaou |
| 8,294,379 B2 | 10/2012 | Liu |
| 8,373,547 B2 | 2/2013 | Benya |
| 8,638,045 B2 | 1/2014 | Kunst |
| 8,648,542 B2 | 2/2014 | Seong-yoon |
| 9,095,023 B2 * | 7/2015 | Deppe ................ H05B 33/0809 |
| 9,468,054 B2 | 10/2016 | Barnetson |
| 2007/0039946 A1 | 2/2007 | Parkhi |
| 2007/0097484 A1 | 5/2007 | Libretto |
| 2013/0113375 A1 | 5/2013 | Leung |
| 2013/0221867 A1 | 8/2013 | Deppe |
| 2013/0234600 A1 | 9/2013 | Park |
| 2013/0293122 A1 | 11/2013 | Huynh |
| 2014/0062325 A1 | 3/2014 | Shenglun |

* cited by examiner

LED RETROFIT LAMP WITH A STRIKE BARRIER

CROSS REFERENCE TO RELATED APPLICATION

This application is a continuation of U.S. application Ser. No. 15/267,105, filed Sep. 15, 2016, which is a continuation-in-part of U.S. application Ser. No. 14/304,964, filed Jun. 15, 2014, now patented as U.S. Pat. No. 9,686,828 on Jun. 20, 2017, the disclosures of each of which are hereby incorporated by reference in their entireties.

FIELD OF THE INVENTION

The present invention relates to a retrofit LED (Light Emitting Diode) lamp suitable for operation with ballast, and more particularly to a LED retrofit lamp with a strike barrier.

BACKGROUND

The development of LED lighting technology paved the way for replacement of fluorescent lamp running on the ballast with the LED retrofit lamps. The replacement of fluorescent lamps with LED lamps requires a considerable investment in term of labor cost for removing the existing fluorescent fixtures and replacing them with the LED lamps.

Various LED replacement lamps were proposed that are adaptable to work with the ballast and thus avoiding the need for replacing ballast fixtures. These LED replacement lamps operates on the AC voltage provided by the ballast. However, these LED replacement lamps are not compatible with all kind of ballasts, especially older models. Normally a fluorescent tube does not conduct current until an arc voltage is reached and starts conducting at normal rate once the arc voltage is breached. The LED lamp shows no such behavior and starts conducting and turning on as soon as a voltage is applied. However certain ballasts either look for a barrier or have a sub-circuit that depends on a barrier being present. Thus these modern LED replacement lamps are incompatible with certain ballast types.

In order to overcome the aforementioned disadvantages, the present invention provides a LED retrofit lamp that provides a strike barrier to the fluorescent ballasts.

BRIEF SUMMARY OF THE INVENTION

A strike barrier for driving an LED retrofit lamp comprising a thyristor having a first terminal, a second terminal and a third terminal, said first terminal is connected to a bridge rectifier, said second terminal is connected to the LED and said third terminal is connected to a series of components that programs the magnitude of the strike barrier. The series of components is a resistor divider having a first resistor placed between the second terminal and the third terminal of the thyristor, and a second resistor placed between the third terminal of the thyristor and a second node present between a first node and the second resistor. The thyristor is silicon controlled rectifier and latching value of the thyristor is set using the resistor divider. An input source for the strike barrier is a ballast having a rating of 270V RMS 25 kHz voltage source and a 420 Ohm series resistor. The first terminal is an anode terminal, the second terminal is a cathode terminal and the third terminal is a gate terminal respectively.

A strike barrier for driving an LED retrofit lamp comprising: a first silicon controlled rectifier having a gate terminal, a cathode terminal and an anode terminal connected to a bridge rectifier; a first resistor divider having a first resistor between the gate terminal and the anode terminal, and a second resistor placed between the gate terminal and the cathode terminal of the first silicon controlled rectifier; a second silicon controlled rectifier having a gate terminal, a cathode terminal and an anode terminal, said anode terminal of the second silicon controlled rectifier is connected to a first node present between the cathode terminal of the first silicon controlled rectifier and the second resistor; a second resistor divider having a third resistor placed between the gate terminal and the cathode terminal of the second silicon controlled rectifier, and a fourth resistor placed between the gate terminal of the second controlled rectifier and a second node present between the first node and the second resistor; a fifth resistor in parallel to the first silicon controlled rectifier connecting output from the bridge rectifier to the second silicon controlled rectifier, wherein a first end of the fifth resistor is connected to the input to first silicon controlled rectifier and a second end of the fifth resistor is connected to the first node and the second node; wherein a third node between the cathode terminal and the gate terminal of the second silicon controlled rectifier is an output of the strike barrier.

The fifth resistor transfers the current coming from the bridge rectifier to the second silicon controlled rectifier bypassing the first silicon controlled rectifier. A latching value of the first silicon controlled rectifier and the second silicon controlled rectifier is set using the first resistor divider and the second resistor divider respectively. The latching value of the first silicon controlled rectifier and second silicon controlled rectifier is set to 400V. On latching of the second silicon controlled rectifier, the first silicon controlled rectifier latches after attaining latching value. The strike barrier further comprises a first capacitor connected in parallel to the second resistor. The first silicon controlled rectifier is latched using the first capacitor having a capacitance value of 1 nF to 20 nF. The strike barrier further comprises a second capacitor connected in parallel to the third resistor. The second silicon controlled rectifier is latched using the second capacitor having a capacitance value of 1 nF to 20 nF. The first resistor and fourth resistor are having a resistance value of 1 MΩ to 10 MΩ and the second resistor and third resistor are having a resistance value of 1 kΩ to 10 kΩ. The fifth resistor is having a resistance value 50 kΩ to 100 kΩ. The input source for the strike barrier is a ballast and the output of the strike barrier is connected to a Zener diode. The ballast is having a rating of 270V RMS 25 kHz voltage source and a 420 Ohm series resistor. The strike barrier is compatible with UL ANSI requirement for a normal mode and an abnormal mode. In the normal mode, the first silicon controlled rectifier and second silicon controlled rectifier are open, thereby conducting a small amount of current. In the abnormal mode, if any of the first silicon controlled rectifier and the second silicon controlled rectifier gets shorted, the other acts as a barrier and if any other components get shorted, a hard short is created to the ballast resulting into opening a fuse.

BRIEF DESCRIPTION OF THE DRAWINGS

The preferred embodiment of the invention will hereinafter be described in conjunction with the appended draw

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Rapid Start and Programmed Start Florescent ballasts preheat the cathodes prior to generating a high enough voltage to strike and arc along the length of the fluorescent tube. The tube is non-conductive until this arc voltage (typically 300-600V) is reached, then the tube conducts in the range of 100V. In a simple LED retrofit, the LEDs show no such behavior, conducting and turning on as soon as a voltage is applied. However some ballast either look for a barrier or have sub-circuits that depend on a barrier being present, thus making the LED lamp incompatible with the fluorescent ballast.

In an embodiment the present invention provides a LED retrofit lamp that contains a circuit called a "strike barrier". The strike barrier allows the LED retrofit lamp to have the same behavior as that of a fluorescent lamp. The strike barrier is a controllable barrier that does not allow current conduction till a threshold voltage, but when breached by a threshold voltage, the circuit latches and allows the conduction at normal operating voltage. The strike value of the barrier can be tuned by choosing the value of the Zener diode on the gate of the TRIAC.

In another embodiment the present invention provides an improved circuit that replicates the cathode heater resistance of a fluorescent lamp to rapid start and programmed start ballasts. The improved circuit comprises a target resistor in front of the bridge rectifier. The resistance value of the resistor can vary from 10 ohm to 30 ohm. The resistor provides the ballast with an alternate path.

Figure 1:
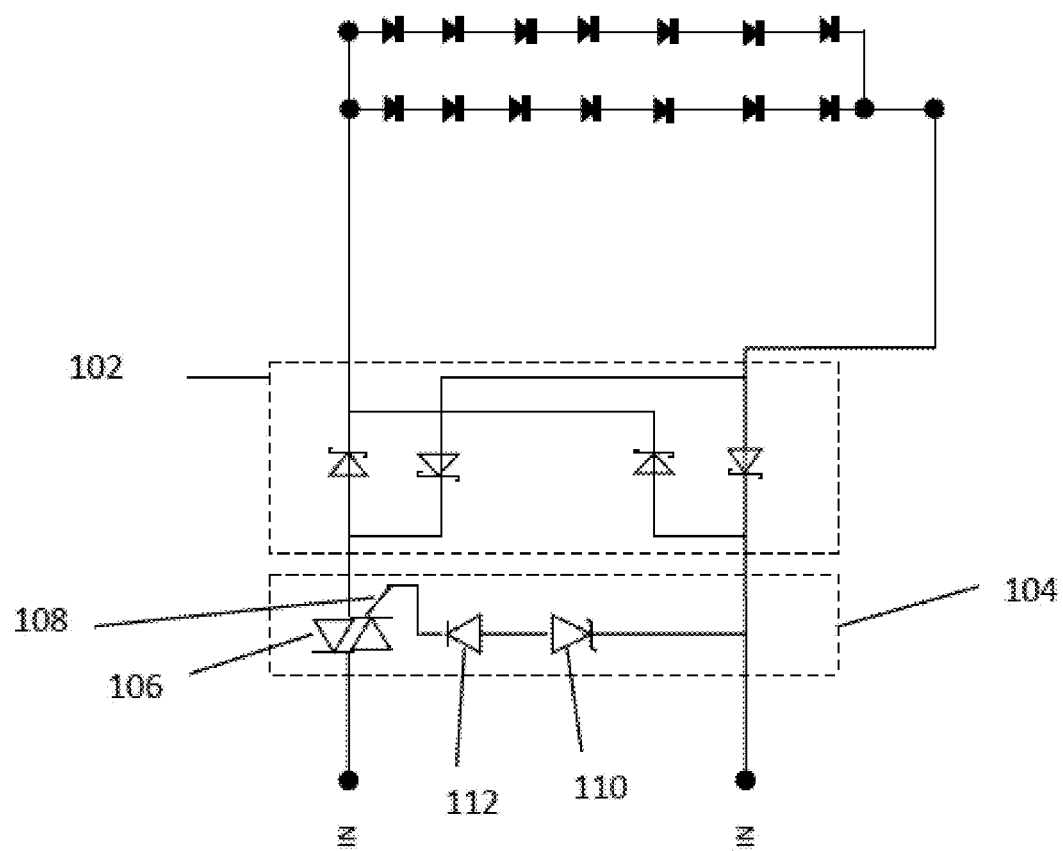
- FIG. 1 illustrates a LED retrofit lamp circuit with a bridge rectifier and a strike barrier in accordance with an embodiment of the present invention.

FIG. 1 illustrates a LED retrofit lamp circuit with a bridge rectifier and a strike barrier in accordance with an embodiment of the present invention. The circuit comprises a bridge rectifier 102 and a strike barrier 104. The bridge rectifier 102 converts the AC voltage supplied from the ballast to the DC voltage required for the LED array. The bridge rectifier is made of Schottky diodes. Since the fluorescent tube works of the principle of arc voltage wherein the ballast preheats the cathode prior to generating a high enough voltage to strike and arc along the length of the fluorescent tube. Therefore the ballast designed for the fluorescent tube either looks for a barrier or have a sub-circuit that depends on a barrier being present. The LED retrofit lamp does not require an arc voltage and start operating as soon as a voltage is applied. However since LED retrofit lamps or tubes are designed to operate with the existing circuit of fluorescent tube, therefore the LED retrofit tube must provide a barrier for the existing ballast. The strike barrier 104 of the circuit provides a barrier to the ballast. The strike barrier 104 allows the LED retrofit lamp to have a same behavior as that of the fluorescent tube. The strike barrier 104 provides the LED retrofit tube a controllable barrier that does not allow current conduction, but once breached the circuit latches and allows conduction at normal operating voltage. The strike barrier comprises a TRIAC (Triode for Alternating current) 106 that can conduct current in either direction when it is turned on. The main terminals of the TRIAC 106 are connected to a first connection terminal of the ballast at one end and to the bridge rectifier 102 at the second end, such that the TRIAC 106 conducts the current from the ballast to the bridge rectifier 102 once it is turned on. The TRIAC 106 gets conductive when a triggering current is applied to its gate terminal 108. The gate terminal 108 of the TRIAC 106 is connected to the second connection terminal of the ballast, such that the gate terminal 108 is in parallel to the bridge rectifier 102. A Zener diode 110 and a diode 112 are present on the line connecting the gate terminal 108 with second connection terminal of the ballast output. The Zener diode 110 is placed in reverse orientation such that it will not allow the current to conduct to the gate terminal 108 of TRIAC 106 until the breakdown voltage is reached. The Zener diode 110 and the TRIAC 106 collectively perform the function of strike barrier 104. At the initial start up of the lamp, the Zener diode 110 prevents the current to flow through it until a breakdown voltage is achieved. When the breakdown voltage is achieved the Zener diode 110 allows the current to flow from it and the current when reached to the TRIAC 106 triggers on the TRIAC and the current from the ballast input flows to the bridge rectifier 102.

In an embodiment of the present invention the bridge rectifier is made of schottky diodes.

Figure 2:
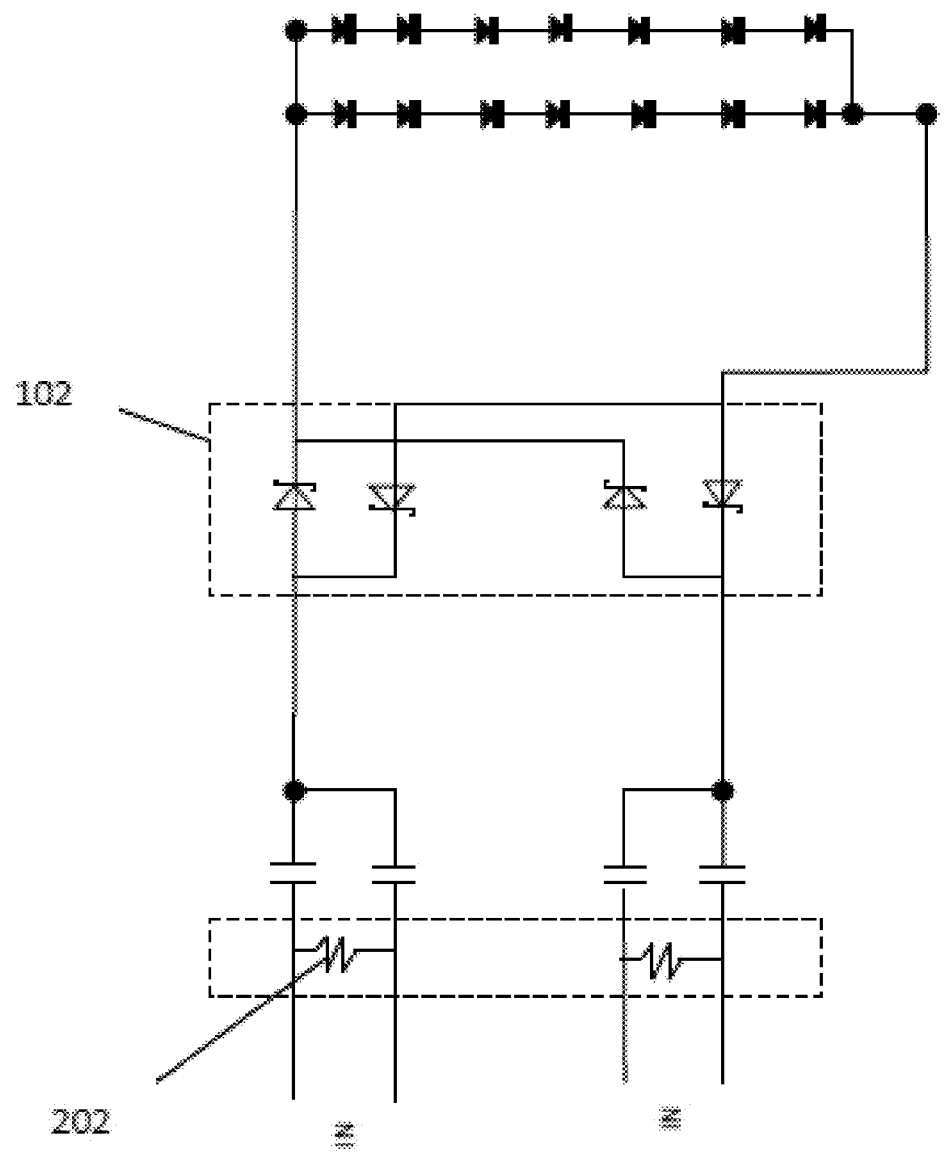
FIG. 2 illustrates a circuit for a LED lamp having cathode heater resistance replicated in accordance with an embodiment of the present invention.

In another embodiment of the present invention, a method to replicate the cathode heater circuit of a fluorescent lamp is provided. The conventional retrofit LED lamp uses resistor tuned to the same value as the hot cathode heater circuit, but the resistor results in wasted power as the arc current must also flow through them. When the LEDs are in a non-conductive state at a zero crossing of the ballast current, the cathode impedance is near infinite. When the LEDs are in a conductive state at the peak of a current cycle; circuit is able to conduct, but the impedance is nearly infinite in the opposite direction. The method of the present invention adds a resistance in front of the bridge rectifier. The resistor is placed at the input of the pluralities of pins, thus providing an alternate path to the ballast current. FIG. 2 illustrates a circuit for a LED lamp having cathode heater resistance replicated in accordance with an embodiment of the present invention. A resistor 202 is placed at both the input of the first connection terminal and second connection terminal of the ballast. The resistance of resistor 202 is equivalent to the cathode heater resistance. The resistance 202 provides an alternate path to the ballast voltage.

In an embodiment of the present invention, a strike barrier with a controllable barrier latching for the needed short abnormal test protection to pass the UL1993.OOLV standard for ballast driven lamps is provided. The strike barrier resolves the compatibility issue present with some ballasts that are unstable if the lamp begins condition at a low voltage.

Figure 3A:
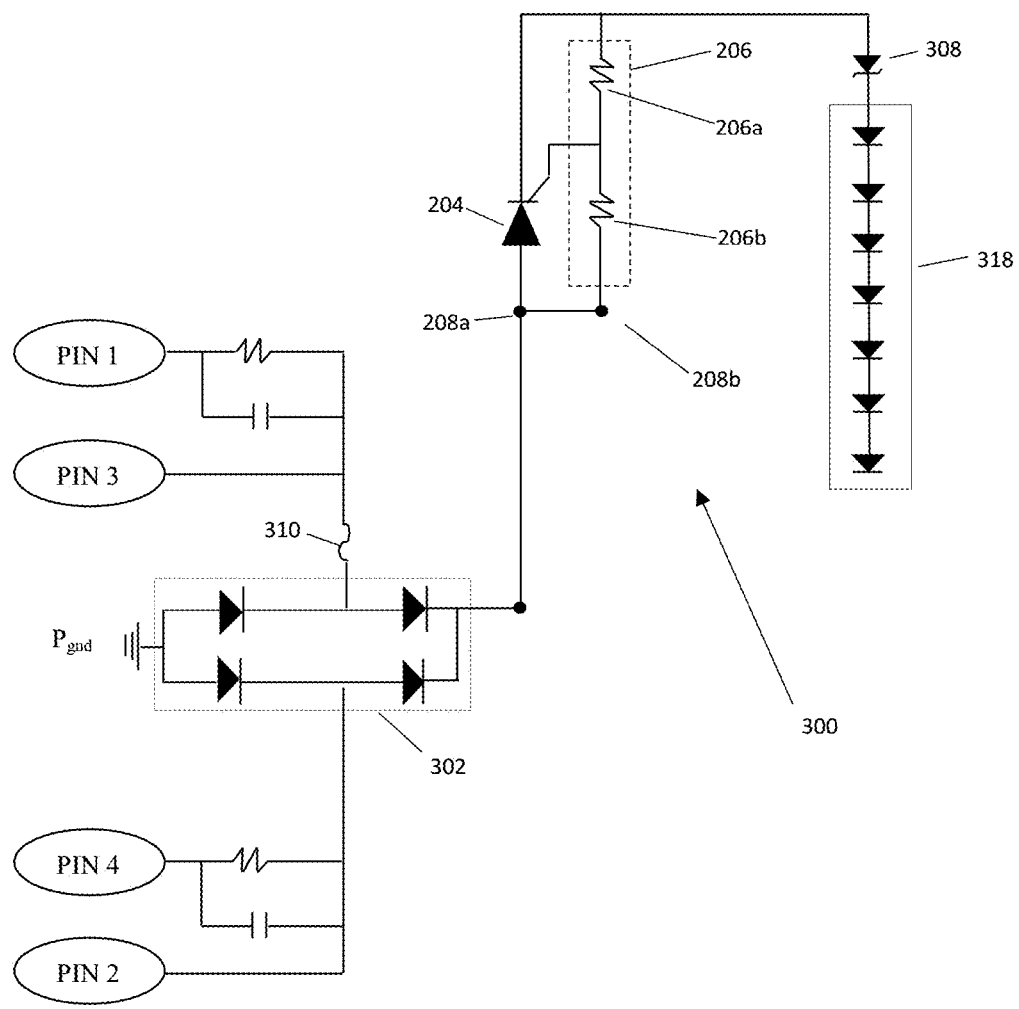
FIG. 3A illustrates a schematic representation of a LED lamp with a strike barrier in accordance with an embodiment of the present invention.

FIG. 3A illustrates a schematic representation of a LED lamp with a strike barrier in accordance with an embodiment of the present invention. The LED retrofit lamp having a strike barrier 300 comprises a plurality of pins (pin1, pin2, pin3 and pin4) that receive input from a ballast source, a bridge rectifier 302 for converting AC voltage coming from the ballast through the plurality of pins to the DC voltage and supplying the DC voltage to the strike barrier 300, a Zener diode 308 connected to an output coming from the strike barrier 300, a fuse 310 between the plurality of pins and the bridge rectifier 302, and one or more light emitting diodes 318 connected to the Zener diode 308. The strike barrier 300 comprises a thyristor 204 connected to a resistor divider 206. The resistor divider 206 comprising a first resistor 206a and a second resistor 206b. The thyristor 204 has a first terminal, a second terminal and a third terminal as an anode terminal, a cathode terminal and a gate terminal respectively. The anode terminal is connected to output of the bridge rectifier 302, the cathode terminal is connected to the LED 318 and the gate terminal is connected to the resistor divider 206. The first resistor 206a of the resistor divider 206 is present between the second terminal and the third terminal of the thyristor 204 and the second resistor 206b is connected between the third terminal of the thyristor 204 and a second node 208b present between a first node 208a and the second resistor 206b. The first node 208a is present between the first terminal of the thyristor 204 and at the output of the bridge rectifier 302. The resister divider 206 programs the magnitude of the strike barrier.

In an embodiment of the present invention, the thyristor 204 used is a silicon controlled rectifier. The thyristor act as a barrier to the forward voltage until it get latched by the forwarding current.

The bridge rectifier 302 converts the AC voltage supplied from the ballast to the DC voltage required for driving said one or more light emitting diode 318. When the bridge rectifier 302 starts conducting current, the thyristor 204 receives the current and latches after attaining the latching value. The latching value of the thyristor 204 is set using the resistor divider 206. In an embodiment, the latching value of the thyristor 204 is set to 400V. When the thyristor 204 has latched, the strike barrier 300 outputs the current to the Zener diode 308. The Zener diode then conducts the current to flow in the forward direction to said one or more light emitting diode 318, till it reaches a threshold voltage. When the Zener diode 308 attains the threshold voltage, it starts conducting in the reverse direction in order to prevent said one or more light emitting diode 318 to getting it damaged.

Figure 3B:
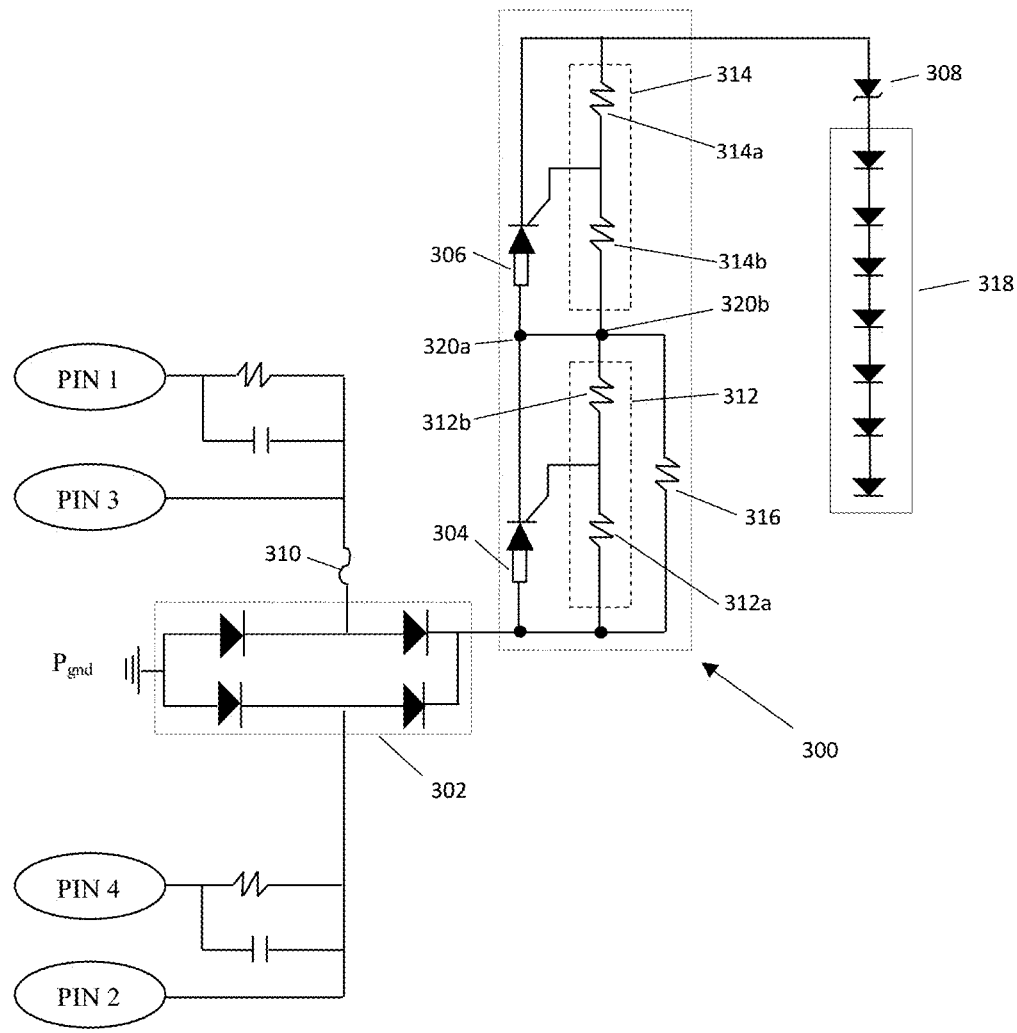
FIG. 3B illustrates the components of a strike barrier used in accordance with an embodiment of the present invention.

FIG. 3B illustrates the components of a strike barrier used in accordance with an embodiment of the present invention. The LED retrofit lamp having a strike barrier 300 comprises a plurality of pins (pin1, pin2, pin3 and pin4) that receive input from a ballast source, a bridge rectifier 302 for converting AC voltage coming from the ballast through the plurality of pins to the DC voltage and supplying the DC voltage to the Strike barrier 300, a Zener diode 308 connected to an output coming from the strike barrier 300, a fuse 310 between the plurality of pins and the bridge rectifier 302, and one or more light emitting diodes 318 connected to the Zener diode 308. The strike barrier 300 comprises a first silicon controlled rectifiers 304 having a first resistor divider 312 and a second silicon controlled rectifier 306 with a second resistor divider 314. The first resistor divider 312 comprising a first resistor 312a and a second resistor 312b. The second resistor divider 314 has a third resistor 314a and a fourth resistor 314b. A fifth resistor 316 is connected in parallel with the first silicon controlled rectifier 304. The first silicon controlled rectifier 304 has a gate terminal, a cathode terminal and an anode terminal which is connected to output of the bridge rectifier 302. The first resistor 312a of the first resistor divider 312 is present between the gate terminal and the anode terminal, and the second resistor 312b is connected between the gate terminal and the cathode terminal of the first silicon controlled rectifier 304. The second silicon controlled rectifier 306 has a gate terminal, a cathode terminal and an anode terminal, where the anode terminal of the second silicon controlled rectifier 306 is connected to a first node 320a present between the cathode terminal of the first silicon controlled rectifier 304 and the second resistor 312b. The second resistor divider 314 consists of the third resistor 314a present between the gate terminal and the cathode terminal of the second controlled rectifier 306 and the fourth resistor 314b is present between the gate terminal of the second controlled rectifier 306 and a second node 320b which is present between the first node 320a and the second resistor 312b. The fifth resistor 316 is connected in parallel to the first silicon controlled rectifier 304 that relay or bypass the output from the bridge rectifier to the anode terminal of the second silicon controlled rectifier 306. A first end of the fifth resistor 316 is connected to the input to first silicon controlled rectifier 304 and a second end of the fifth resistor 316 is connected to the first node 320a and the second node 320b.

In an embodiment of the present invention, the first resistor 312a and the fourth resistor 314b are having a resistance value of 1 MΩ to 10 MΩ, the second resistor 312b and the third resistor 314a are having a resistance value of 1 kΩ to 10 kΩ and the fifth resistor 316 is having a resistance value 50 kΩ to 100 kΩ.

In an embodiment of the present invention, the first silicon controlled rectifier 304 and the second silicon controlled rectifier 306 are latched through a capacitor.

In another embodiment of the present invention, the first resistor 312a and the fourth resistor 314b have a rating 1M, ¼ W, 400V and the second resistor 312b and the third resistor have a rating of 3.01K, ⅛ W, and the fifth resistor 316 has a rating of 100K, ½ W, 400V.

The bridge rectifier 302 converts the AC voltage supplied from the ballast to the DC voltage required for driving said one or more light emitting diode 318. When the bridge rectifier 302 starts conducting current, the fifth resistor 316 transfers the current coming from the bridge rectifier 302 to the second silicon controlled rectifier 306, thus bypassing the first silicon controlled rectifier 304. The latching value of the first silicon controlled rectifier 304 and the second silicon controlled rectifier 306 is set using the first resistor divider 312 and the second resistor divider 314 respectively. In an embodiment, the latching value of the first silicon controlled rectifier 304 and the second silicon controlled rectifier 306 is set to 400V. When the second silicon controlled rectifier 306 receives the current through the fifth resistor 316, the second silicon controlled rectifier latches first after attaining the latching value. Thereafter, the current starts conducting towards the gate terminal of the first silicon controlled rectifier 304 and get latched on attaining the latching value.

When both the first silicon controlled rectifier 304 and the second controlled rectifier 306 has latched, the strike barrier 300 outputs the current to the Zener diode 308. The Zener diode then conducts the current to flow in the forward direction to said one or more light emitting diode 318, till it reaches a threshold voltage. When the Zener diode 308 attains the threshold voltage, it starts conducting in the reverse direction in order to prevent said one or more light emitting diode 318 to getting it damaged.

Figure 3C:
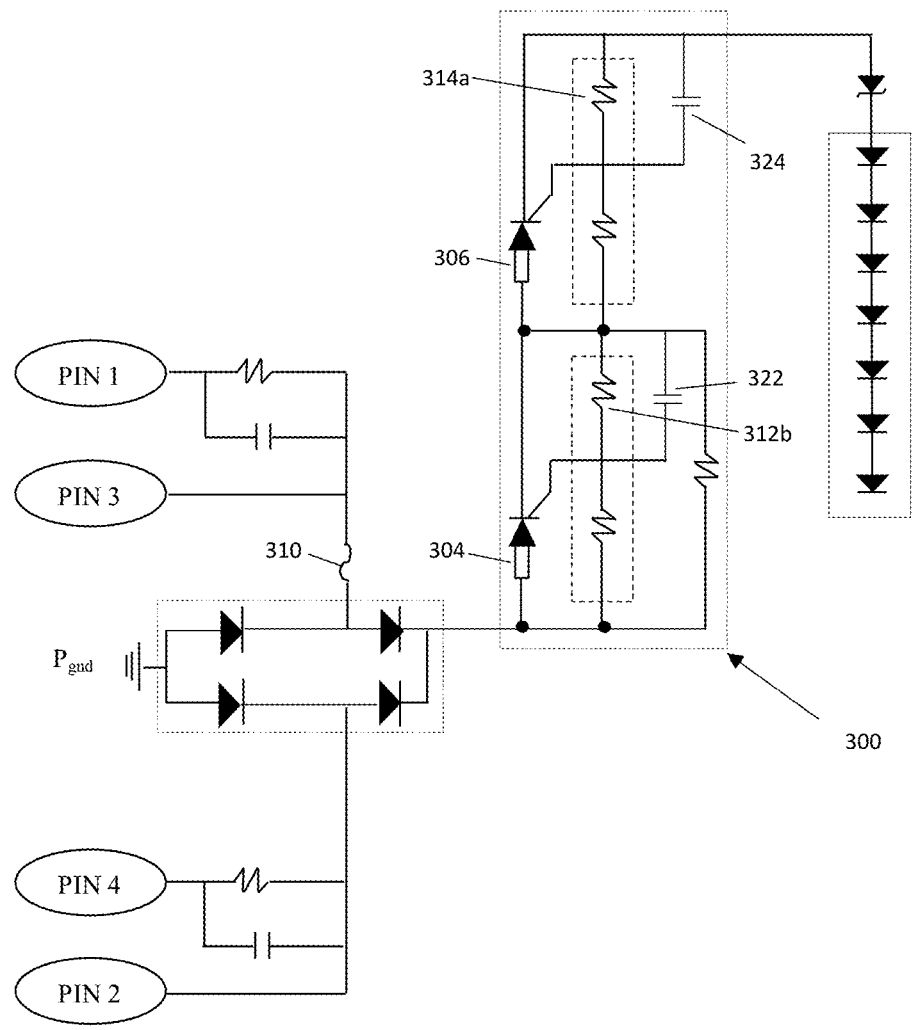
FIG. 3C illustrates the strike barrier with a latching capacitor in accordance with another embodiment of the present invention.

In an embodiment of the present invention, a set of capacitor can be used for latching of the first silicon controlled rectifier and the second silicon controlled rectifier in the strike barrier. FIG. 3C illustrates the strike barrier 300 with a latching capacitor in accordance with another embodiment of the present invention. The strike barrier 300 includes a first capacitor 322 connected in parallel to the second resistor 312b and a second capacitor 324 connected in parallel to the third resistor 314a. The first silicon controlled rectifier 304 is latched using the first capacitor 322 and the second silicon controlled rectifier 306 is latched using the second capacitor 324. The first capacitor 322 and the second capacitor 324 are having a capacitance value of 1 nF to 20 nF in order to latch the first silicon controlled rectifier and the second silicon controlled rectifier.

In one implementation, the input source for the strike barrier is a ballast having a rating of 270V RMS 25 kHz voltage source and a 420 Ohm series resistor. The strike barrier is compatible with UL ANSI requirement for operating in a normal mode and an abnormal mode. In the normal mode, the first silicon controlled rectifier 304 and second silicon controlled rectifier 306 is open, thereby conducts a very small amount of current. While, in the abnormal mode, if any of the first silicon controlled rectifier 304 and the second silicon controlled rectifier 306 gets shorted, the other acts as a barrier and if any other components get shorted, a hard short is created to the ballast that results into opening the fuse 310.

The foregoing merely illustrates the principles of the present invention. Other variations to the disclosed embodiments can be understood and effected by those skilled in the art in practicing the claimed invention from a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used advantageously. Any reference signs in the claims should not be construed as limiting the scope of the claims. Various modifications and alterations to the described embodiments will be apparent to those skilled in the art in view of the teachings herein. It will thus be appreciated that those skilled in the art will be able to devise numerous techniques which, although not explicitly described herein, embody the principles of the present invention and are thus within the spirit and scope of the present invention. All references cited herein are incorporated herein by reference in their entireties.

We claim:

1. A strike barrier for driving an LED retrofit lamp comprising:
    a first silicon controlled rectifier having a gate terminal, a cathode terminal and an anode terminal connected to a bridge rectifier;
    a first resistor divider having a first resistor between the gate terminal and the anode terminal, and a second resistor placed between the gate terminal and the cathode terminal of the first silicon controlled rectifier;
    a second silicon controlled rectifier having a gate terminal, a cathode terminal and an anode terminal, said anode terminal of the second silicon controlled rectifier is connected to a first node present between the cathode terminal of the first silicon controlled rectifier and the second resistor;
    a second resistor divider having a third resistor placed between the gate terminal and the cathode terminal of the second silicon controlled rectifier, and a fourth resistor placed between the gate terminal of the second controlled rectifier and a second node present between the first node and the second resistor;
    a fifth resistor in parallel to the first silicon controlled rectifier connecting output from the bridge rectifier to the second silicon controlled rectifier, wherein a first end of the fifth resistor is connected to the input to first silicon controlled rectifier and a second end of the fifth resistor is connected to the first node and the second node;
    wherein a third node between the cathode terminal and the gate terminal of the second silicon controlled rectifier is an output of the strike barrier.

2. The strike barrier of claim 1, wherein the fifth resistor transfer the current coming from the bridge rectifier to the second silicon controlled rectifier bypassing the first silicon controlled rectifier.

3. The strike barrier of claim 1, wherein latching value of the first silicon controlled rectifier and the second silicon controlled rectifier is set using the first resistor divider and the second resistor divider respectively.

4. The strike barrier of claim 3, wherein the latching value of the first silicon controlled rectifier and second silicon controlled rectifier is set to 400V.

5. The strike barrier of claim 1, wherein the strike barrier further comprises a first capacitor connected in parallel to the second resistor.

6. The strike barrier of claim 5, wherein the first silicon controlled rectifier is latched using the first capacitor.

7. The strike barrier of claim 5, wherein the first capacitor is having a capacitance value of 1 nF to 20 nF.

8. The strike barrier of claim 1, wherein the strike barrier further comprises a second capacitor connected in parallel to the third resistor.

9. The strike barrier of claim 8, wherein the second silicon controlled rectifier is latched using the second capacitor.

10. The strike barrier of claim 8, wherein the second capacitor is having a capacitance value of 1 nF to 20 nF.

11. The strike barrier of claim 1, wherein the first resistor and fourth resistor are having a resistance value of 1 MΩ to 10 MΩ.

12. The strike barrier of claim 1, wherein the second resistor and third resistor are having a resistance value of 1 kΩ to 10 kΩ.

13. The strike barrier of claim 1, wherein the fifth resistor is having a resistance value 50 kΩ to 100 kΩ.

14. The strike barrier of claim 1, wherein the output of the strike barrier is connected to a Zener diode.

15. The strike barrier of claim 1, wherein the strike barrier is compatible with UL ANSI requirement for a normal mode and an abnormal mode.

16. The strike barrier of claim 15, wherein in the normal mode, the first silicon controlled rectifier and second silicon controlled rectifier are open, thereby conducting a small amount of current.

17. The strike barrier of claim 15, wherein in the abnormal mode, if any of the first silicon controlled rectifier and the second silicon controlled rectifier gets shorted, the other acts as a barrier and if any other components get shorted, a hard short is created to the ballast resulting into opening a fuse.

* * * * *